United States Patent [19]

Berger

[11] Patent Number: 5,759,642
[45] Date of Patent: Jun. 2, 1998

[54] PROCESS FOR PRODUCING A POLYMER WHICH CAN BE USED AS A POWDER COATING MATERIAL AND/OR HOT-MELT ADHESIVE

[75] Inventor: Steffen Berger, Düsseldorf, Germany

[73] Assignee: Arplas Gesellschaft fur Plasmatechnologie mbH, Weissandt-Golzau, Germany

[21] Appl. No.: 586,698

[22] PCT Filed: Jul. 22, 1994

[86] PCT No.: PCT/EP94/02407

§ 371 Date: Jan. 25, 1996

§ 102(e) Date: Jan. 25, 1996

[87] PCT Pub. No.: WO95/03344

PCT Pub. Date: Feb. 2, 1995

[30] Foreign Application Priority Data

Jul. 26, 1993 [DE] Germany ............ 43 25 377.6

[51] Int. Cl.⁶ ............ C09J 123/00; B05D 3/14; C08J 3/28
[52] U.S. Cl. ............ 427/562; 156/309.6; 156/327; 156/334; 204/168; 264/483; 427/375; 427/461; 427/569; 427/195; 522/157; 522/161; 523/300
[58] Field of Search ............ 264/483; 523/300; 204/168; 522/157, 161; 427/535, 195, 375, 461, 562, 56 P; 150/309.6; 156/327, 334

[56] References Cited

U.S. PATENT DOCUMENTS

| | | | |
|---|---|---|---|
| 4,626,473 | 12/1986 | Loh et al. | 428/409 |
| 5,234,723 | 8/1993 | Babacz | 427/491 |

FOREIGN PATENT DOCUMENTS

| | | | |
|---|---|---|---|
| 3619694 | 12/1987 | Germany | 264/483 |
| 41 41 805 | 6/1993 | Germany . | |
| 52-121651 | 4/1976 | Japan . | |
| 52-141864 | 4/1976 | Japan . | |
| 59-008732 | 1/1984 | Japan . | |
| 4243543 | 8/1992 | Japan . | |

OTHER PUBLICATIONS

"Coatings, Inks, and Related Products," Chemical Abstracts vol. 102, No. 2, Jan. 14, 1995, Abstract No. 8261f. D.A. Rodchenko et al. Kunststoff Taschenbuch, pp. 258 & 259.

Primary Examiner—Peter A. Szekely
Attorney, Agent, or Firm—Finnegan, Henderson, Farabow, Garrett & Dunner

[57] ABSTRACT

A process for producing a polymer which can be used as a powder coating material or a hot-melt adhesive in which at least one polyolefin is subjected to a low-temperature plasma treatment with frequencies changing during the treatment in a frequency range of from 30 kHz to 10 GHz.

26 Claims, 1 Drawing Sheet

PROCESS FOR PRODUCING A POLYMER WHICH CAN BE USED AS A POWDER COATING MATERIAL AND/OR HOT-MELT ADHESIVE

BACKGROUND OF THE INVENTION

The invention relates to a process for producing a polymer which can be used preferably as a powder coating material and/or hot-melt adhesive and to its use.

Processes for producing powder coating materials in which generally a mixing of polyethylene with α-olefinic polymeric additives takes place are already known (Catalog MIRATHEN Leuna Werke AG, 10/92). The polymeric additives contain certain functional groups which permit corresponding use of the powder coating material produced therefrom. It is disadvantageous in this case that there can only ever be produced one powder coating material for a limited application in each case. On the other hand, it is not possible to produce a powder coating material for a broad field of applications.

Furthermore, hot-melt adhesives are known, in particular on the chemical bases of polyvinyl acetate, polyamides, ethylene-vinyl acetate copolymers and polyester. These hot-melt adhesives are likewise formulated for certain specific applications, the requirements of which they meet, so that there are strict limits to any possibility of versatile use of the hot-melt adhesives.

DE-A 41 41 805 discloses a process and an apparatus for producing thermoplastic parts with the aid of low-temperature plasmas. This involves treating powdered or granular raw materials with low-temperature plasma before they are molded into a semi-finished product or component, in order to obtain a modification of the powder grain surface of the raw materials over a limited period of time.

The invention is therefore based on the object of providing a process of generic type by which powder coating materials and/or hot-melt adhesives which are versatile, that is to say can be used for a multiplicity of different application areas, can be produced in a simple and inexpensive way.

SUMMARY OF THE INVENTION

This object is achieved according to the invention by polyolefins being subjected to a low-temperature plasma treatment with frequencies changing during the treatment in a frequency range from 30 kHz to 10 GHz. Low-temperature plasma treatment is understood here to mean that the material to be treated is itself not heated beyond a certain temperature range, for example 40° C. to 60° C. It has surprisingly been found that, by this plasma treatment, the introduced polyolefins can be adjusted such that they can be used as powder coating materials or hotmelt adhesives generally, in particular also with different materials.

In an advantageous refinement of the invention it is envisaged that the plasma treatment is carried out preferably in a frequency range from 13.56 MHz to 2.45 GHz. In particular if the plasma treatment is carried out at changing frequencies, preferably with combinations of varyingly high, changing frequencies, it is possible very advantageously to cater for a different chemical structure and different compositions of the polyolefins serving as starting materials, so that in each case powder coating materials or hot-melt adhesives having the properties necessary for their intended use can be produced.

In a further preferred refinement of the invention, it is envisaged that the plasma treatment is carried out under the supply of an inert gas, for example helium and/or argon, or under the supply of a reaction gas, for example oxygen and/or nitrogen. It is further preferred if the plasma treatment is carried out successively with an inert-gas plasma and at least one reaction-gas plasma or a reaction-gas plasma mixture or under the supply of a mixture of at least one inert gas and one reaction gas. By selection of a composition of the process gas matched to the starting material (inert gas, reaction gas, reaction gas mixture) it is possible to incorporate to an adequate extent the reactive groups required for the purpose of a coating and/or adhesive bonding, for example hydroxyl groups, carboxyl groups, primary and secondary amino groups. These groups are capable of reacting with the material to be coated and/or to be adhesively bonded and of forming chemical bonds and/or of bonding physically. Likewise created polar, but non-reactive groups (carbonyl groups, tertiary amino groups) effect only a physical bonding.

In particular in the case of a succession of combinations of different frequencies, these combinations being matched to the respective process gas and to the starting material, powder coating materials and/or hot-melt adhesives having desired properties can be produced.

BRIEF DESCRIPTION OF THE DRAWINGS

The invention is explained in more detail below in an exemplary embodiment with reference to the associated drawings, in which.

DETAILED DESCRIPTION OF THE INVENTION

Figure 1:
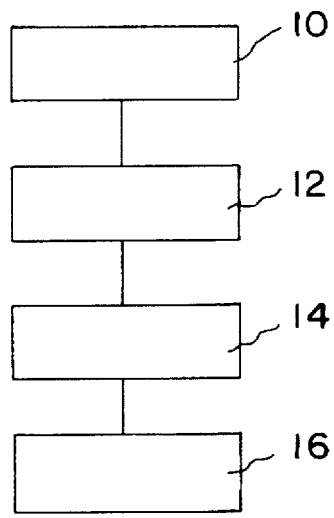
FIG. 1 shows a process sequence for producing a powder coating material and/or a hot-melt adhesive in a flow diagram and FIG. 2 shows a schematic representation of an arrangement for carrying out the process.

In FIG. 1, the process is intended to be illustrated with the aid of a diagram. In a first step 10, the polyolefins Available as starting materials are prepared. The polyolefins are brought here into a powdered and/or granular form, the grain size of which is, for example, less than 1 mm, any required additives, such as for example stabilizers, being added. Both virgin polyolefins and polyolef ins obtained as recycled material may be used as starting materials. In the case of polyolefins from recycled material, it must be ensured that they are not excessively degraded, that is to say that there is still a suitable molecular structure. In a next step 12, the prepared starting material is introduced into a process chamber. The process chamber may in this case be, for example, a rotary drum of a plasma furnace, known per se, for carrying out a low-temperature plasma treatment.

In a next step 14, the process parameters and process gases desired for the treatment of the starting material are set. In particular, the specific combinations of the process gases are fixed, that is to say a first treatment with an inert-gas plasma, preferably with helium and/or argon, and the following treatment with a reaction-gas plasma, preferably with oxygen and/or nitrogen, or else the treatment with a plasma which is produced from a mixture of the above-mentioned gases. Furthermore, the setting of the high frequencies necessary for plasma generation in a vacuum and their succession in time is performed.

Thus, variants in which a plasma treatment is carried out first of all-at a low frequency, for example 13.56 MHz, and subsequently at a higher frequency, for example 2.45 GHz, are conceivable. In addition, an alternating cutting in of the frequencies is conceivable. It goes without saying that other frequencies can also be set in any desired, freely selectable sequence for carrying out the plasma treatment. Moreover, the desired rotational speed of the rotary drum is set, for example in the range between 4 and 20 revolutions per minute, and the desired process pressure, which lies for example in the range between 0.3 mbar and 1 mbar. During the plasma treatment, the process pressure may be subject to fluctuations, process-dependently. Furthermore, the duration of the treatment, over which the treatment of the starting material takes place, is fixed. This is, for example, between 15 and 600 s. The said process parameters and process gases may be varied with one another in any desired combination and are matched in particular to the composition of the respective actual starting material.

In a next step 16, the plasma treatment of the starting material then takes place with the process parameters and process conditions set in step 14. In this case it is likewise conceivable that, in step 16, a change in and/or adaptation of the process parameters may be performed during the plasma treatment, for example by a closed-loop control. The incorporation to an adequate extent into the polyolefins of the reactive groups required for the purpose of coating and/or adhesive bonding, dependent on the starting material used, can be achieved by the described combination of process gases and process parameters of low-temperature plasma treatment.

The powder coating materials and/or hot-melt adhesives produced by the process according to the invention can be produced from all compounds belonging to the group of polyolefins, for example from all polyethylene grades (LDPE, LLDPE, HDPE) and also polypropylene.

Figure 2:
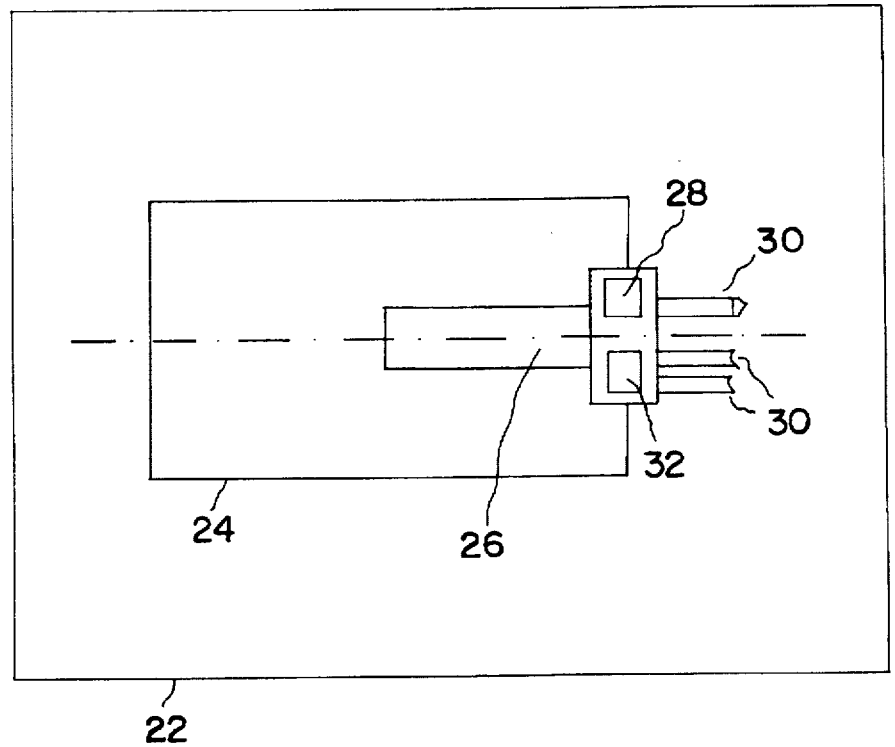

With the powder coating materials and/or hot-melt adhesives produced, all materials of which the melting temperature is above the processing temperature of the materials according to the invention, for example about 120° C. to 180° C., can be coated and/or adhesively bonded. These may be, for example, such different materials as glass, ceramic, steel, aluminum, wood, paper and polymers. These materials may be precoated or otherwise pretreated. With the materials according to the invention, coatings and/or adhesive bondings which are largely resistant to external mechanical and/or chemical influences and have a durable, good adhesive strength can be achieved. By virtue of these advantageous properties, use of the coating materials produced by the process according to the invention is possible preferably in those areas which impose very high requirements on a coating. These are, in particular, underfloor coating in automobile construction or a coating of ships' hulls. In addition, any other possible use is of course conceivable The construction of an apparatus which can be used for the process is schematically shown in FIG. 2. A low-temperature plasma installation, denoted generally by 22, has a rotary drum 24. The rotary drum 24 serves as process chamber and may consist, for example, of a resistant material such as aluminum or stainless steel. For the creation of a vacuum, the process chamber can be hermetically sealed, it not being intended here to go into any further details. The rotary drum 24 is assigned a device 26, which serves as a reactor and is coupled to a generator 28 for microwave plasma excitation and to a high-frequency feed 32. Furthermore, feed lines 30 for supplying process gases are provided.

The arrangement represented here is only by way of example, and the invention does not relate specifically to the actual construction of the installation. The process according to the invention can of course also be carried out by an analogous apparatus which performs the individual process steps.

The process according to the invention thus proceeds in the following way. The selected and prepared starting material is introduced into the rotary drum 24 and mixed there in a manner corresponding to the chosen speed of rotation and direction of rotation, which may also be chosen to alternate. The chosen process gas or process gas mixture is fed via the feed lines 30 and a plasma is generated in the reactor 26 by means of the generator 28. The plasma generation may in this case be performed preferably with a microwave irradiation at outputs of between 200 and 1500 W (2.45 GHz). The process gas or process gas mixture has in this case preferably a process pressure of between 0.3 and 1 mbar. By means of the high-frequency feed 32, a frequency of, for example, 13.56 MHz is applied and a plasma is generated. From the plasma generated, activated particles strike the starting material which has been charged into the rotary drum 24. This effects a change in structure within the starting material, that is of the charged polyolefin, in the form of the incorporation of polar groups (oxygen-containing and/or nitrogen-containing). These polar groups are both reactive groups (hydroxyl groups, carboxyl groups, primary and secondary amino groups) and non-reactive groups (carbonyl groups, tertiary amino groups). A crosslinkage does not take place. By appropriately changing feeding of different process gases by means of the feed lines 30 and different application of frequencies by means of the generator 28 or the high-frequency feed 32, influence can be brought to bear on different compositions of the starting materials.

In an actual example, LDPE (AL 22 FA) having a grain size of less than 1 mm is charged into the rotary drum 24 as the starting material. A process pressure of 0.75 mbar at a rotational speed of 8 revolutions per minute of the rotary drum 24 is set as the process parameter. The output of the generator 28 is 600 W and that of the high-frequency feed 32 is likewise 600 W. A mixture of argon, oxygen and nitrogen is fed as process gases and the introduced starting material is plasma-treated for the duration of 270 s. The generator 28 thereby generates a frequency of 2.45 GHz and the high-frequency feed 32 generates a frequency of 13.56 MHz. With the material obtained after completion of the production process, a transparent, well-adhering coating can be applied to glass at a processing temperature of 160° C.

I claim:

1. A process for producing a polymer that can be used as a powder coating material or a hot-melt adhesive, which comprises subjecting at least one polyolefin to a low-temperature plasma treatment at frequencies changing during the treatment in a frequency range of from 30 kHz to 10 Ghz.

2. The process of claim 1, wherein the plasma treatment is carried out in a frequency range of from 13.56 MHz to 2.45 GHz.

3. The process of claim 1 or 2, wherein the plasma treatment is carried out with combinations of varyingly high, changing frequencies.

4. The process of claim 1, wherein the polyolefin is selected from the group consisting of polyethylene and polypropylene.

5. The process of claim 1, wherein the plasma treatment is carried out under an inert gas.

6. The process of claim 5, wherein the inert gas is selected from the group consisting of helium and argon.

7. The process of claim 1, wherein the plasma treatment is carried out under a reaction gas.

8. The process of claim 7, wherein the reaction gas is selected from the group consisting of oxygen and nitrogen.

9. The process of claim 1, wherein the plasma treatment is carried out successively under an inert-gas plasma and at least one reaction-gas plasma is carried out successively under an inert-gas plasma and a reaction-gas mixture plasma, or under a mixture of at least one inert gas and at least one reaction gas.

10. The process of claim 1, wherein the plasma treatment is performed at a process pressure of from 0.3 mbar to 1 mbar.

11. The process of claim 1, wherein the plasma treatment has a duration of 15 s to 600 s.

12. The process of claim 1, wherein the polyolefin is subjected to the plasma treatment as a powder or as granules having a grain size of less than 1 mm.

13. The process of claim 1, wherein the polyolefin is moved during the plasma treatment.

14. The process of claim 13, wherein the polyolefin is agitated in a rotating drum during the plasma treatment.

15. The process of claim 14, wherein the drum is rotated at a speed of 4 to 20 revolutions per minute.

16. The process of claim 1, wherein the polyolefin is a material selected from the group consisting of virgin polyolefin material, recycled polyolefin material, and mixtures thereof.

17. The process of claim 1, wherein at least one additive is added to the polyolefin before the plasma treatment.

18. The process of claim 17, wherein the additive is a stabilizer.

19. Powder coating material comprising the polymer produced by the process of claim 1.

20. A hot-melt adhesive, comprising the polymer produced by the process of claim 1.

21. A method for applying a protective coating to a material which comprises coating the material with a polyolefin treated according to claim 1 wherein the material has a melting temperature lying above a processing temperature of the treated polyolefin.

22. A method for bonding together materials which comprises adhesively bonding the materials together with a polyolefin treated according to claim 1 wherein the materials have a melting temperature lying above a processing temperature of the treated polyolefin.

23. The method of claim 21 or 22, wherein the material is selected from the group consisting of glass, ceramic, steel, aluminum, wood, paper, and polymers.

24. The method of claim 21, wherein the material is precoated.

25. The method of claim 21, wherein the material coated is the underflooring of an automobile.

26. The method of claim 21, wherein the material coated is a ship's hull.

* * * * *